UNITED STATES PATENT OFFICE.

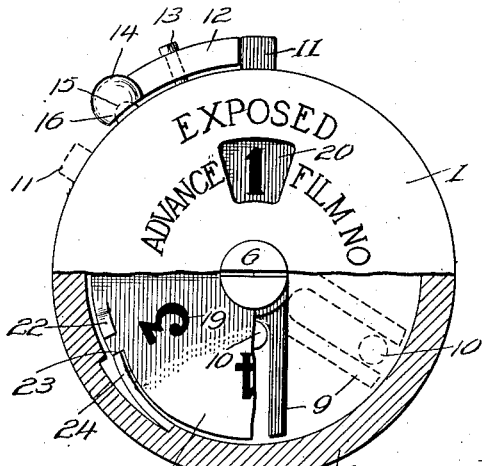
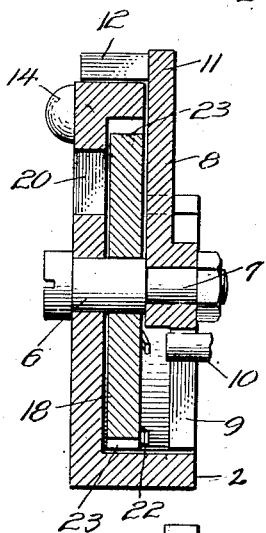
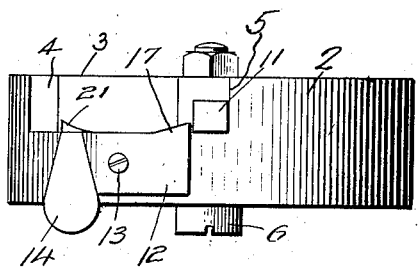
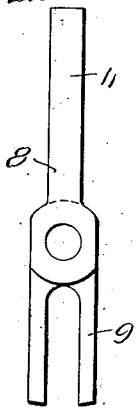
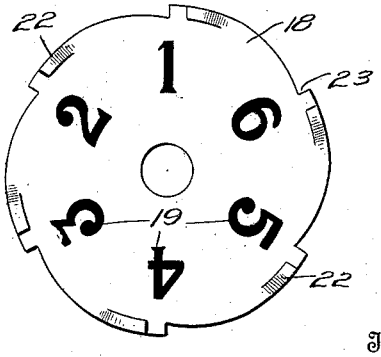

WALTER EVERS, OF JERSEY CITY, NEW JERSEY.

CAMERA ATTACHMENT.

1,294,433.   Specification of Letters Patent.   Patented Feb. 18, 1919.

Application filed October 31, 1916.   Serial No. 128,786.

*To all whom it may concern:*

Be it known that I, WALTER EVERS, a citizen of the United States, residing at Jersey City, in the county of Hudson and State of New Jersey, have invented new and useful Improvements in Camera Attachments, of which the following is a specification.

This invention relates to an automatic safety catch and exposure register for the shutters of photographic cameras, the object in view being to provide a device of the character referred to which will automatically prevent the exposure of two pictures on a single film or sensitized surface by reminding the photographer to advance the film or present a fresh and unexposed sensitized surface in accordance with a number displayed to the operator, who is unable to operate the shutter of the camera to make another exposure until the safety device is manipulated in the manner hereinafter explained.

With the above and other objects in view, the invention consists in the novel construction, combination and arrangement of parts, herein fully described, illustrated and claimed.

In the accompanying drawing:

Figure 1 is a face view partly in section of the combined safety catch and register.

Fig. 2 is a vertical diametrical section through the same, showing the center pivot bolt in elevation.

Fig. 3 is a top plan view thereof.

Fig. 4 is a detail view of the lever which connects with the main shutter bolt.

Fig. 5 is a face view of the dial.

In carrying out the present invention in the preferred embodiment thereof, I employ a frame piece or casing 1 which is shown as open at the rear and formed with a flange or rim 2 extending around and backwardly from the disk shaped face portion of the casing, a portion of said rim 2 being cut away to form a slot 3 which provides circumferentially spaced stop shoulders 4 and 5 as shown in Fig. 3, the purpose of which will presently appear.

Mounted centrally in and supported by the casing 1 is a pivot bolt 6 and mounted to turn on a reduced journal portion 7 thereof is a shutter controlled and actuated lever 8. This lever has two arms, one arm 9 thereof being forked as shown to slidingly engage a pin or stud 10 on the main bolt of the shutter of a photographic camera. The other arm 11 of said lever is of sufficient length to project beyond the periphery of the casing 1 so as to be engaged by a latch 12 which is connected by a pivot 13 to the flange 2 of the casing 1. This latch is provided with a thumb or finger piece 14 and is also formed on the under side thereof with a notch or depression 15 adapted to be moved into and out of frictional engagement with a detent 16 shown in the form of a small half round projection on the flange 2 of the casing 1. The free end of the latch 12 is formed with a beveled nose 17 acting upon by the projecting end of the arm 11 of the lever 8 in the return movement of said lever.

Journaled on the pivot pin 6 and located between the disk shaped front wall 1 of the casing and the lever 8 is a dial 18 having numbers or graduations thereon indicated at 19, said graduations or numbers being arranged in a circular series and adapted to be exposed one at a time by a sight opening 20 in the casing 1 as shown in Fig. 1. The dial 18 is turned with a step by step movement produced by the lever 8 which successively engages teeth 22 projecting from the rear face of the dial 18, the dial being actuated the distance of one tooth by and during the return movement of the arm 11 of the lever 8. The dial 18 is provided with other teeth 23 on the periphery thereof which are engaged by a catch 24 shown in the form of a spring extending inwardly in a curvilinear path from the inner face of the flange 2 of the casing 1, the catch 24 serving to prevent retrograde movement of the dial and holding the latter where it is left by the lever 11 in the movement of the latter between the shoulders 4 and 5, the shoulder 4 limiting the movement of the arm 11 in one direction and the shoulder 5 limiting the movement of the arm in the other direction.

From the foregoing description taken in connection with the accompanying drawing it will be understood that in order to operate the shutter, the pin or stud 10 carried by the main shutter bolt must move through a given path. When the operator attempts to work the shutter, the pin 10 of the shutter bolt is held against movement by the lever 8 which is temporarily locked by the latch 12. As the lever 8 is locked, the shutter cannot be operated and this prevents the operator from making a second exposure on the same film or sensitized surface. To operate the shutter he must then first throw the latch 12 out of locked engagement with the projecting end of the arm 11 of the lever 8. This allows the shutter to work and as the shutter performs its operation, the lever 8 is rocked, causing the arm 11 to move from the shoulder 4 of the casing 1 to the shoulder 5 thereof. In the return movement of the shutter, the pin or stud 10 travels in the opposite direction through the action of the shutter spring (not shown) and this causes the arm 11 to move from the shoulder 5 back to the shoulder 4 and in so doing, the projection 21 on the arm 11 engages the adjacent tooth 22 on the dial 18 and moves the dial the distance of one tooth thereby bringing the next number or graduation 19 into view through the sight opening 20. The device is adapted to be used in connection with any photographic camera shutter employing the usual main active bolt which is operated either by hand or air compressing bulb. Time or bulb exposures do not interfere with the device hereinabove described and herein shown as the shutter bolt makes but one complete back and forth movement for either a time or instantaneous exposure.

I claim:—

A camera attachment comprising a casing open at one side and provided with a rim having a circumferential slot whose end walls constitute stop shoulders, a pivot bolt extending through the central portion of the casing and supported thereby, a lever mounted from said bolt and having a portion adapted to be actuated by the shutter mechanism, said lever having an arm extending through said slot, a latch pivoted to said casing adjacent to the slot thereof, a finger piece forming a part of said latch and having a depression, a detent formed on said casing to co-act with the depression when the lever is moved to one position, the free end of the latch having a beveled nose adapted to engage behind the arm of said lever and confine said arm against one of said stop shoulders, the thumb piece having an extended nose adapted to engage with said arm when the latter is moved against said other stop shoulder, a dial mounted to revolve on said bolt and provided with numbers thereon, the casing having an opening therein through which said numbers are adapted to be singly displayed, means on the dial, and means on said lever coöperating with said dial means to rotate the dial in one direction, and means for preventing retrograde rotation of said dial.

In testimony whereof I affix my signature.

WALTER EVERS.